(12) United States Patent
Sheng et al.

(10) Patent No.: US 11,133,701 B2
(45) Date of Patent: Sep. 28, 2021

(54) METHOD AND APPARATUS FOR CHARGING AND MUTUAL CHARGING A COMBINATION OF INTELLIGENT DEVICES

(71) Applicant: HuiZhou TCL Mobile Communication Co., Ltd., HuiZhou (CN)

(72) Inventors: Chulong Sheng, HuiZhou (CN); Wentao Huang, HuiZhou (CN); Xiongcai Wu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 223 days.

(21) Appl. No.: 16/476,085

(22) PCT Filed: Jan. 4, 2018

(86) PCT No.: PCT/CN2018/071455
§ 371 (c)(1),
(2) Date: Jul. 4, 2019

(87) PCT Pub. No.: WO2018/127105
PCT Pub. Date: Jul. 12, 2018

(65) Prior Publication Data
US 2019/0334362 A1    Oct. 31, 2019

(30) Foreign Application Priority Data
Jan. 5, 2017   (CN) .......................... 201710007783.X (51) Int. Cl.
*H02J 7/00*       (2006.01)
*H02J 7/34*       (2006.01)
*H01M 10/44*   (2006.01)

(52) U.S. Cl.
CPC ........... *H02J 7/342* (2020.01); *H01M 10/441* (2013.01); *H02J 7/0036* (2013.01); *H02J 7/0068* (2013.01); *H02J 7/00* (2013.01)

(58) Field of Classification Search
CPC .......... H02J 2207/20; H02J 7/342; H02J 7/00; H02J 7/00034; H02J 2300/30; H02J 3/381;
(Continued)

(56) References Cited

U.S. PATENT DOCUMENTS

| 9,997,933 B2 * | 6/2018 | Huang ................... H02J 7/0029 |
| 2016/0006272 A1 * | 1/2016 | Greening ............ H02J 7/00047 320/162 |
| 2017/0005489 A1 * | 1/2017 | Kwon ................... H02J 7/0013 |

FOREIGN PATENT DOCUMENTS

| CN | 201146393 | 11/2008 |
| CN | 102255346 | 11/2011 |

(Continued)

OTHER PUBLICATIONS

Notification of Office Action and Search Report dated Jan. 6, 2020 From the State Intellectual Property Office of the People's Republic of China Re. Application No. 201710007783.X. (10 Pages).

*Primary Examiner* — Binh C Tat (57) ABSTRACT

An apparatus for charging and mutual charging a combination of intelligent devices. The apparatus comprises a main device and an accessory device. The main device comprises a first control module and a first switch for switching on and off a first charging port. The accessory device comprises a second control module and a second switch for switching on and off a second charging port. The first control module is electrically connected to the second control module to realize mutual charging between intelligent devices. During outdoor use, one device when running out of power is (Continued)

automatically charged by another device until the combination of devices is completely out of power.

13 Claims, 2 Drawing Sheets

(58) Field of Classification Search
CPC ........ H02J 3/387; H02J 50/80; H02J 7/00045; H02J 7/0029; H02J 2207/40; H02J 2310/46; H02J 50/10; H02J 50/20; H02J 50/23; H02J 50/40; H02J 50/60; H02J 50/90; H02J 7/0036; H02J 7/0068; H02J 7/025; H02J 7/34; H01M 2220/30; H01M 16/006; H01M 10/441; H01M 2010/4271; H01M 6/5044; H02M 3/1582; H02M 1/0074
USPC .................................................. 320/100–107
See application file for complete search history.

(56) References Cited

FOREIGN PATENT DOCUMENTS

| CN | 102340156 | 2/2012 |
|---|---|---|
| CN | 103532173 | 1/2014 |
| CN | 104953678 | 9/2015 |
| CN | 105790349 | 7/2016 |
| CN | 106602663 | 4/2017 |

* cited by examiner

METHOD AND APPARATUS FOR CHARGING AND MUTUAL CHARGING A COMBINATION OF INTELLIGENT DEVICES

RELATED APPLICATIONS

This application is a National Phase of PCT Patent Application No. PCT/CN2018/071455 having International filing date of Jan. 4, 2018, which claims the benefit of priority of Chinese Patent Application No. 201710007783.X filed on Jan. 5, 2017. The contents of the above applications are all incorporated by reference as if fully set forth herein in their entirety.

FIELD AND BACKGROUND OF INVENTION

The present invention relates to a technical field of intelligent device charging, and more particularly to a method and an apparatus for charging and mutual charging a combination of intelligent devices.

The battery life of terminal equipment has been a common concern issue. Many devices have occasionally suffered from insufficient battery life, and, what is more, many modern intelligent terminal devices have intelligent accessories that need power supply or are capable of power supply, such as a tablet with a keyboard accessory device, a mobile phone with a charging base accessory device, and the similar.

Dual devices may share a common power bank while each device should be charged individually, which is inconvenient.

Users may lose some functions of dual devices during outdoor use when one of the devices runs out of electric power.

SUMMARY OF THE INVENTION

The technical problem to be solved by the invention is to provide a method and an apparatus for charging and mutual charging a combination of intelligent devices, which can realize charging entirety of the combination through charging one device in the combination, and mutual charging during outdoor use where one device in the group of the devices once running out of electric power is charged by another device in the group of the devices.

The invention utilizes a technical scheme to address the technical problem, which is an apparatus for charging and mutual charging a combination of intelligent devices comprising a main device and an accessory device. The main device comprises a main input circuit. The main input circuit comprises a first control module, a first battery, a first battery management module, a first switch and a first charging port. The first control module controls the first switch. The first switch is electrically connected with the first battery management module. The first battery management module charges the first battery. The accessory device comprises a secondary input circuit. The secondary input circuit comprises a second control module, a second battery, a second battery management module, a second switch and a second charging port. The second control module controls the second switch. The second switch is electrically connected with the second battery management module, and the second battery management module charges the second battery. Each of the first charging port and the second charging port is capable of controlling the first switch and the second switch through a pin. The first control module is electrically connected to the second control module by means of a control protocol.

The first control module and the second control module interact to realize power and charge management. A boost mutual charging circuit is established between the first battery and the second battery.

The main device further comprises a first boost switch, the first battery is electrically connected with the first boost switch, the first boost switch is electrically connected with the second battery management module, the accessory device further comprises a second boost switch. The second battery is electrically connected with the second boost switch. The second boost switch is electrically connected with the first battery management module. The first boost switch is electrically connected with the first control module. The second boost switch is electrically connected with the second control module. The first control module and the second control module are connected through three sets of control protocols, and each of the first boost switch and the second boost switch is turned off until receiving activation.

The first charging port is connected to the first switch and the second switch through a VBUS, and the second charging port is connected to the first switch and the second switch through a VBUS.

The first control module is electrically connected with the second control module through a general-purpose input/output (GPIO) control protocol.

The invention utilizes another technical scheme to address the technical problem, which is an apparatus for charging and mutual charging a combination of intelligent devices comprising a main device and an accessory device. The main device comprises a main input circuit. The main input circuit comprises a first control module, a first battery, a first battery management module, a first switch and a first charging port. The first control module controls the first switch. The first switch is electrically connected with the first battery management module, and the first battery management module charges the first battery. The accessory device comprises a secondary input circuit. The secondary input circuit comprises a second control module, a second battery, a second battery management module, a second switch and a second charging port. The second control module controls the second switch. The second switch is electrically connected with the second battery management module, and the second battery management module charges the second battery. Each of the first charging port and the second charging port is capable of controlling the first switch and the second switch through a pin. The first control module is electrically connected to the second control module by means of a control protocol.

The first control module and the second control module interact to realize power and charge management.

The first charging port is connected to the first switch and the second switch through a VBUS, and the second charging port is connected to the first switch and the second switch through a VBUS.

The first control module and the second control module are electrically connected through GPIO control protocol.

The invention further provides a charging method utilizing an apparatus for charging and mutual charging a combination of intelligent devices, comprising: charging the main device and the accessory device of the apparatus for charging and mutual charging a combination of intelligent devices through the first charging port and/or the second charging port.

The method comprises: (a) a charging process when inserting a charger of the main device comprises the following steps: (1) inserting the charger of the main device; (2) opening the first charging port to perform charging by the main equipment and the accessory device; (b) a charging process when inserting a charger of the accessory device comprises the following steps: (1) inserting the charger of the accessory device; (2) opening the second charging port to perform charging by the main device and the accessory device; and (c) simultaneously inserting the charger of the main device and the charger of the accessory device, and charging through a path of a charging circuit selected from the first charging port or the second charging port by the first switch and the second switch.

The method comprises: (a) a charging process by inserting a universal serial bus (USB) of the main device comprises the following steps: (1) inserting the USB of the main device; (2) opening the first charging port by the first switch, and notifying the second control module by the first control module to allow the second control module to control the second switch to close the first charging port; (b) a charging process by inserting a USB of the accessory device comprises the following steps: (1) inserting the USB of the accessory device; (2) opening the second charging port by the second switch, and notifying the first control module by the second control module to allow the first control module to control the first switch to close the second charging port; and (c) a charging process by simultaneously inserting the USB of the main device and the USB of the accessory device comprises the following steps: (1) simultaneously inserting the USB of the main device and the USB of the accessory device; (2) upon the first control module being notified by the second control module about the simultaneously inserting of the USBs, controlling by the first control module the first switch to open only the first charging port and close the second charging port; (3) upon the second control module being notified by the first control module about the simultaneously inserting of the USBs, controlling by the second control module the second switch to open only the second charging port and close the first charging port.

The method comprises: (a) a charging process by inserting a charger of the main device and inserting a USB of the accessory device comprises the following steps: (1) inserting the charger of the main device and inserting the USB of the accessory device; (2) notifying the first control module about the inserting of the USB by the second control module; (3) upon identifying by the first control module that the main device has the inserted charger, controlling the first switch by the first control module to assign high priority to the charger, only open the first charging port, and close the second charging port; (4) upon detecting the inserting of the USB by the second control module, controlling the second switch by the second control module to open the second charging port and close the first charging port; (b) a charging process by inserting a USB of the main device and inserting a charger of the accessory device comprises the following steps: (1) inserting the charger of the accessory device and inserting the USB of the main device; (2) notifying the second control module by the first control module about the inserting of the USB; (3) upon identifying by the second control module that the accessory device has the inserted charger, controlling the second switch by the second control module to assign high priority to the charger, only open the second charging port, and close the first charging port; (4) upon detecting the inserting of the USB by the first control module, controlling the first switch by the first control module to open the first charging port and close the second charging port.

The method comprises: charging the main device by the accessory device comprises the following steps: (1) setting a minimum voltage value and an allowable charge voltage value; (2) when voltage of the main device is below the minimum voltage value, requesting the second battery management module of the accessory device to charge the main device using a set of control protocols; (3) when the second control module of the accessory device receives the requesting and determines that voltage of the accessory device is higher than the allowable charge voltage value, outputting voltage from the accessory device to the first battery management module of the main device through the second boost switch; (4) notifying the first control module to start charging through another set of control protocols; and charging the accessory device by the main device comprises the following steps: (1) setting the minimum voltage value and the allowable charge voltage value; (2) when voltage of the accessory device is below the minimum voltage value, requesting the first battery management module of the main device to charge the accessory device using a set of control protocols; (3) when the first control module of the main device receives the requesting and determines that voltage of the main device is higher than the allowable charge voltage value, outputting voltage from the main device to the second battery management module of the accessory device through the first boost switch; (4) notifying the second control module to start charging through another set of control protocol.

A mutual battery charging process for the main device and the accessory device alternates and circulates until power is exhausted.

A charging current in the mutual battery charging process for the main device and the accessory device is limited to a low current value.

The charging current in the mutual battery charging process for the main device and the accessory device is limited to 500 mA.

The beneficial effect of the invention is:

First, the apparatus for charging and mutual charging a combination of intelligent devices of the invention can charge a group of intelligent devices by charging any arbitrary device in the group of devices, which is more convenient to use.

Second, the apparatus for charging and mutual charging a combination of intelligent devices of the invention can realize mutual charging during outdoor use where one of the combined intelligent devices once running out of electric power is charged by another device in the combined intelligent devices until power of all the combined intelligent device is exhausted.

Third, the apparatus for charging and mutual charging a combination of intelligent devices of the invention can perform charging solely using a charger or a universal serial bus (USB), or simultaneously using both of a charger and a USB, and thus may be more suitable for various use scenarios.

DESCRIPTION OF SPECIFIC EMBODIMENTS OF THE INVENTION

Detailed description is given in the following with reference to the drawings and embodiments.

To make the objectives, technical schemes, and technical effects of the present invention clear and definite, the present invention is detailed in the following. It should be understood that the specific embodiments described herein are merely for explaining and not intended to limit the present invention.

Figure 1:
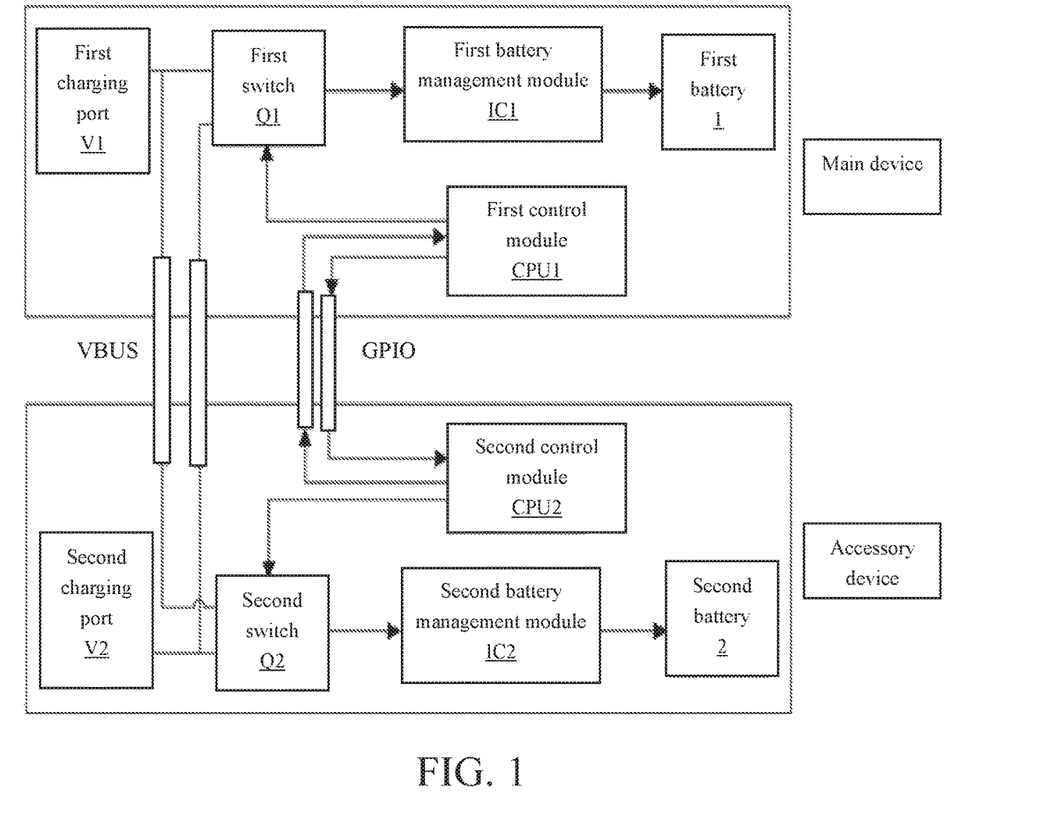
FIG. 1 is a schematic view showing an apparatus for charging and mutual charging a combination of intelligent devices of the invention which is charged from an exterior power source.

As shown in FIG. 1, an apparatus for charging and mutual charging a combination of intelligent devices includes a main device and an accessory device, wherein the main device comprises a main input circuit, and the accessory device comprises a secondary input circuit.

The main input circuit comprises a first control module CPU1, a first battery 1, a first battery management module IC1, a first switch Q1 and a first charging port V1. The first control module CPU1 controls the first switch Q1. The first switch Q1 is electrically connected with the first battery management module IC1. The first battery management module IC1 charges the first battery 1.

The accessory device comprises the secondary input circuit. The secondary input circuit comprises a second control module CPU2, a second battery 2, a second battery management module IC2, a second switch Q2 and a second charging port V2. The second control module CPU2 controls the second switch Q2. The second switch Q2 is electrically connected with the second battery management module IC2. The second battery management module IC2 charges the second battery 2.

Each of the first charging port V1 and the second charging port V2 is capable of controlling the first switch Q1 and the second switch Q2 through a pin. The first control module CPU1 is electrically connected to the second control module CPU2 by means of a control protocol. The first control module CPU1 and the second control module CPU2 interact to realize power and charge management.

Preferably, the first charging port V1 and the second charging port V2 controls the first switch Q1 and the second switch Q2 through a VBUS, which is a power source pin.

Preferably, the first control module CPU1 is electrically connected with the second control module CPU2 through a general-purpose input/output (GPIO) control protocol.

Figure 2:
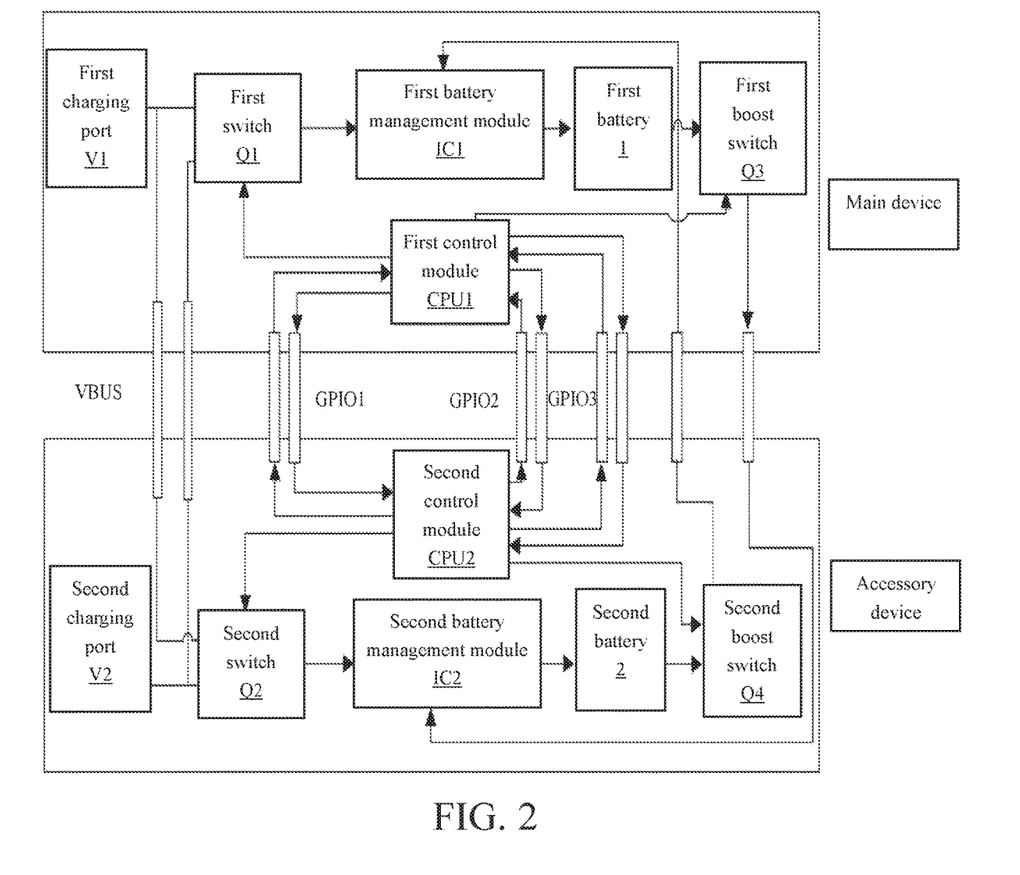
FIG. 2 is a schematic view showing an apparatus for charging and mutual charging a combination of intelligent devices of the invention which is capable of mutual charging.

As shown in FIG. 2, an apparatus for charging and mutual charging a combination of intelligent devices includes a main device and an accessory device, wherein the main device comprises the main input circuit, and the accessory device comprises the secondary input circuit. The first battery 1 of the main device and the second battery 2 of the accessory device establishes a boost mutual charging circuit, that is a boost circuit, between the first battery 1 and the second battery 2.

In addition to the circuit in FIG. 1. The main device further comprises a first boost switch Q3. The first battery 1 is electrically connected with the first boost switch Q3, and the first boost switch Q3 is electrically connected with the second battery management module IC2. The accessory device further comprises a second boost switch Q4. The second battery 2 is electrically connected with the second boost switch Q4. The second boost switch Q4 is electrically connected with the first battery management module IC1. The first boost switch Q3 is electrically connected with the first control module CPU1. The second boost switch Q4 is electrically connected with the second control module CPU2, and the first control module CPU1 and the second control module CPU2 are connected through three sets of control protocols. Each of the first boost switch Q3 and the second boost switch Q4 is turned off until receiving activation.

Preferably, the three sets of control protocols connected between the first control module CPU1 and the second control module CPU2 are GPIO protocols.

A charging method utilizing an apparatus for charging and mutual charging a combination of intelligent devices can charge a group of intelligent devices by individually charging a main device of an accessory device in the group of devices, or simultaneously charging the main device and the accessory device.

The apparatus for charging and mutual charging a combination of intelligent devices of the invention can perform charging solely using a charger or a universal serial bus (USB), or simultaneously using a charger and a USB, and thus may be more suitable for various use scenarios.

A charging process when inserting a charger of the main device comprises the following steps: (1) inserting the charger of the main device; (2) opening the first charging port V1 to perform charging by the main equipment and the accessory device.

A charging process when inserting a charger of the accessory device comprises the following steps: (1) inserting the charger of the accessory device; (2) opening the second charging port V2 to perform charging by the main device and the accessory device.

Upon simultaneously inserting the charger of the main device and the charger of the accessory device, the first switch Q1 and the second switch Q2 selects a path of a charging circuit to execute charging by selecting the first charging port V1 or the second charging port V2 as the entrance of the path.

In an alternative embodiment, a charging method utilizing an apparatus for charging and mutual charging a combination of intelligent devices can charge a group of intelligent devices using a USB, or charge the whole group of devices by charging any arbitrary device in the group of devices using USB.

A charging process by inserting a universal serial bus (USB) of the main device comprises the following steps: (1) inserting the USB of the main device; (2) opening the first charging port V1 by the first switch Q1, and notifying the second control module CPU2 by the first control module CPU1 to allow the second control module CPU2 to control the second switch Q2 to close the first charging port V1;

A charging process by inserting a USB of the accessory device comprises the following steps: (1) inserting the USB of the accessory device; (2) opening the second charging port V2 by the second switch Q2, and notifying the first control module CPU1 by the second control module CPU2 to allow the first control module CPU1 to control the first switch Q1 to close the second charging port V2;

A charging process by simultaneously inserting the USB of the main device and the USB of the accessory device comprises the following steps: (1) simultaneously inserting the USB of the main device and the USB of the accessory device; (2) upon the first control module CPU1 being notified about the simultaneously inserting of the USBs by the second control module CPU2, controlling by the first control module CPU1 the first switch Q1 to open only the first charging port V1 and close the second charging port V2; (3) upon the second control module CPU2 being notified about the simultaneously inserting of the USBs by the first control module CPU1, controlling by the second control module CPU2 the second switch Q2 to open only the second charging port V2 and close the first charging port V1.

In an alternative embodiment, a charging method utilizing an apparatus for charging and mutual charging a combination of intelligent devices can charge a group of combined intelligent devices simultaneously using a charger and a USB.

A charging process by inserting a charger of the main device and inserting a USB of the accessory device comprises the following steps: (1) inserting the charger of the main device and inserting the USB of the accessory device; (2) notifying the first control module CPU1 about the inserting of the USB by the second control module CPU2; (3) upon identifying by the first control module CPU1 that the main device has an inserted charger, controlling the first switch Q1 by the first control module CPU1 to assign high priority to the charger, only open the first charging port V1, and close the second charging port V2; (4) upon detecting the inserting of the USB by the second control module CPU2, controlling the second switch Q2 by the second control module CPU2 to open the second charging port V2 and close the first charging port V1;

A charging process by inserting a USB of the main device and inserting a charger of the accessory device comprises the following steps: (1) inserting the charger of the accessory device and inserting the USB of the main device; (2) notifying by the first control module CPU1 the second control module CPU2 about the inserting of the USB; (3) upon identifying by the second control module CPU2 that the main device has the inserted charger, controlling the second switch Q2 by the second control module CPU2 to assign high priority to the charger, only open the second charging port V2, and close the first charging port V1; (4) upon detecting the inserting of the USB by the first control module CPU1, controlling the first switch Q1 by the first control module CPU1 to open the first charging port V1 and close the second charging port V2;

The charging method utilizing an apparatus for charging and mutual charging a combination of intelligent devices can charge a group of intelligent devices by charging any arbitrary device in the group of intelligent devices.

The description above is the operations in different conditions, which can be optimized as demanded. The description above is simply an illustration of applying the invention in various scenarios.

In a preferred embodiment of the invention, a charging method utilizing an apparatus for charging and mutual charging a combination of intelligent devices comprises:

Charging the main device by the accessory device comprises the following steps: (1) setting a minimum voltage value and an allowable charge voltage value; (2) when voltage of the main device is below the minimum voltage value, requesting the second battery management module IC2 of the accessory device to charge the main device using a set of control protocols; (3) when the second control module CPU2 of the accessory device receives the requesting and determines that voltage of the accessory device is higher than the allowable charge voltage value, outputting voltage to the first battery management module IC1 of the main device through the second boost switch Q4; (4) notifying the first control module CPU1 to start charging through another set of control protocols; and (5) the charging process alternates and circulates until power is exhausted.

Charging the accessory device by the main device comprises the following steps: (1) setting the minimum voltage value and the allowable charge voltage value; (2) when voltage of the accessory device is below the minimum voltage value, requesting the first battery management module IC1 of the main device to charge the accessory device using a set of control protocols; (3) when the first control module CPU1 of the main device receives the requesting and determines that voltage of the main device is higher than the allowable charge voltage value, outputting voltage from the main device to the second battery management module IC2 of the accessory device through the first boost switch Q3; (4) notifying the second control module CPU2 to start charging through another set of control protocols; and (5) the charging process alternates and circulates until power is exhausted.

Preferably, each of the first charging port V1 and the second charging port V2 controls the first switch Q1 and the second switch Q2 through a VBUS.

Preferably, the first control module CPU1 is electrically connected with the second control module CPU2 through GPIO control protocol.

Note that in any occasion, the each of first boost switch Q3 and the second boost switch Q4 is turned off until receiving activation.

When the battery voltage of the main device is lower than the minimum voltage value, such as 20%, the first control module CPU1 through one pin in the GPIO2 notifies the second control module CPU2 and directs the battery of the accessory device to output voltage to charge the main device. The second control module CPU2, upon receiving the requesting, determines voltage of the accessory device. If the voltage of the accessory device is higher than the allowable charge voltage value, such as 23%, the second control module CPU2 outputs 5V voltage signals to a charging integrated circuit (IC) of the main device through the second boost switch Q4, and notifies the first control module CPU1 to start charging through another pin in the GPIO2.

When the battery voltage of the accessory device is lower than the minimum voltage value, such as 20%, the second control module CPU2 through one pin in the GPIO3 to notify the first control module CPU1 to request the battery of the main device to output voltage to charge the accessory device. The first control module CPU1, upon receiving the requesting, determines that voltage of the main device. If the voltage of the main device is higher than the allowable charge voltage value, such as 23%, the first control module CPU1 outputs 5V voltage signals to the charging IC of the accessory device through the first boost switch Q3, and notifies the second control module CPU2 to start charging through another pin in the GPIO3.

Preferably, the minimum voltage value and the allowable charge voltage value may be fine-tuned in the actual situations.

In the charging method utilizing an apparatus for charging and mutual charging a combination of intelligent devices of the invention, the protocol set may be improved as the number of the GPIO increases. In alternative embodiments, communication between the CPUs of two intelligent devices may be realized by other communication means.

Preferably, to reduce number of pins and for safety issues during mutual charging of the batteries, charging current is limited to a low current value, preferably 500 mA.

It should be noted that the charging processes using the USB and the charger are illustrated in the description for better understanding, but are not to limited to the charging mode. Other charging modes may be applied.

Disclosed is a method utilizing an apparatus for charging and mutual charging a combination of intelligent devices, which can realize mutual charging during outdoor use where one of the combined intelligent devices once running out of electric power is charged by another device in the combined intelligent devices until power of all the combined intelligent device is exhausted.

The name of devices and mode of communication ports described in the disclosure are not intended to limited the invention. Similar devices and communication ports may be applied to the invention.

Although the detail embodiments of the invention are described above for better understanding by those skilled persons in the art, it should be understood that the application of the present invention is not limited to the above examples, and can be improved or modified within the spirit and scope specified and clarified in the claims, which should be accorded the broadest interpretation so as to encompass all such improvements and modifications.

What is claimed is:

1. An apparatus for charging and mutual charging a combination of intelligent devices, comprising:
   a main device comprising a main input circuit, the main input circuit comprising:
      a first control module;
      a first battery;
      a first battery management module;
      a first switch, electrically connected with the first battery management module, wherein the first control module controls the first switch, and the first battery management module charges the first battery; and
      a first charging port; and
   an accessory device comprising a secondary input circuit, the secondary input circuit comprising:
      a second control module;
      a second battery;
      a second battery management module;
      a second switch, electrically connected with the second battery management module, wherein the second control module controls the second switch, and the second battery management module charges the second battery; and
      a second charging port;
   wherein each of the first charging port and the second charging port is capable of controlling the first switch and the second switch through a pin, and the first control module is electrically connected to the second control module by means of a control protocol;
   wherein the first control module and the second control module interact to realize power and charge management, and a boost mutual charging circuit is established between the first battery and the second battery;
   wherein the main device further comprises a first boost switch, the first battery is electrically connected with the first boost switch, the first boost switch is electrically connected with the second battery management module, the accessory device further comprises a second boost switch, wherein the second battery is electrically connected with the second boost switch, the second boost switch is electrically connected with the first battery management module, the first boost switch is electrically connected with the first control module, the second boost switch is electrically connected with the second control module, the first control module and the second control module are connected through three sets of control protocols, and each of the first boost switch and the second boost switch is turned off until receiving activation;
   when a battery voltage of the main device is lower than a first minimum voltage value, the first control module through at least one pin notifies the second control module and directs the second battery of the accessory device to output voltage to charge the main device, the second control module, upon receiving the notifying, determines a voltage of the accessory device, if the voltage of the accessory device is higher than a first allowable charge voltage value, the second control module outputs voltage signals to the first battery management module of the main device through the second boost switch, and through at least one pin notifies the first control module to start charging;
   when a battery voltage of the accessory device is lower than a second minimum voltage value, the second control module through at least one pin notifies the first control module to request the first battery of the main device to output voltage to charge the accessory device, the first control module, upon receiving the requesting, determines the voltage of the main device, if the voltage of the main device is higher than a second allowable charge voltage value, the first control module outputs voltage signals to the second battery management module of the accessory device through the first boost switch, and through at least one pin notifies the second control module to start charging.

2. The apparatus for charging and mutual charging a combination of intelligent devices of the claim 1, wherein the first charging port is connected through VBUS to the first switch and the second switch, and the second charging port is connected to the first switch and the second switch through a VBUS.

3. The apparatus for charging and mutual charging a combination of intelligent devices of the claim 1, wherein the first control module is electrically connected with the second control module through a general-purpose input/output (GPIO) control protocol.

4. A charging method utilizing an apparatus for charging and mutual charging a combination of intelligent devices, wherein the apparatus comprises:
   a main device comprising a main input circuit, the main input circuit comprising:
      a first control module;
      a first battery;
      a first battery management module;
      a first switch, electrically connected with the first battery management module, wherein the first control module controls the first switch, and the first battery management module charges the first battery; and
      a first charging port; and
   an accessory device comprising a secondary input circuit, the secondary input circuit comprising:
      a second control module;
      a second battery;
      a second battery management module;
      a second switch, electrically connected with the second battery management module, wherein the second control module controls the second switch, and the second battery management module charges the second battery; and
      a second charging port;

wherein each of the first charging port and the second charging port is capable of controlling the first switch and the second switch through a pin, and the first control module is electrically connected to the second control module by means of a control protocol;

wherein the charging method utilizing the apparatus for charging and mutual charging a combination of intelligent devices comprises: charging the main device and the accessory device of the apparatus for charging and mutual charging a combination of intelligent devices through the first charging port and/or the second charging port;

wherein the first control module and the second control module interact to realize power and charge management, a boost mutual charging circuit is established between the first battery and the second battery, the main device further comprises a first boost switch, the first battery is electrically connected with the first boost switch, and the first boost switch is electrically connected with the second battery management module, and the accessory device comprises a second boost switch, wherein the second battery is electrically connected with the second boost switch, the second boost switch is electrically connected with the first battery management module, the first boost switch is electrically connected with the first control module, the second boost switch is electrically connected with the second control module, and the first control module and the second control module are connected through three sets of control protocols, each of the first boost switch and the second boost switch is turned off until receiving activation;

charging the main device by the accessory device comprises the following steps: (1) setting a minimum voltage value and an allowable charge voltage value; (2) when voltage of the main device is below the minimum voltage value, requesting the second battery management module of the accessory device to charge the main device using a set of control protocols; (3) when the second control module of the accessory device receives the requesting and determines that voltage of the accessory device is higher than the allowable charge voltage value, outputting voltage from the accessory device to the first battery management module of the main device through the second boost switch; (4) notifying the first control module to start charging through another set of control protocols; and charging the accessory device by the main device comprises the following steps: (1) setting the minimum voltage value and the allowable charge voltage value; (2) when voltage of the accessory device is below the minimum voltage value, requesting the first battery management module of the main device to charge the accessory device using a set of control protocols; (3) when the first control module of the main device receives the requesting and determines that voltage of the main device is higher than the allowable charge voltage value, outputting voltage from the main device to the second battery management module of the accessory device through the first boost switch; (4) notifying the second control module to start charging through another set of control protocol.

5. The charging method of claim 4, wherein:
(a) a charging process when inserting a charger of the main device comprises the following steps: (1) inserting the charger of the main device; (2) opening the first charging port to perform charging by the main equipment and the accessory device;
(b) a charging process when inserting a charger of the accessory device comprises the following steps: (1) inserting the charger of the accessory device; (2) opening the second charging port to perform charging by the main device and the accessory device; and
(c) simultaneously inserting the charger of the main device and the charger of the accessory device, and charging through a path of a charging circuit selected from the first charging port or the second charging port by the first switch and the second switch.

6. The charging method of claim 4, wherein:
(a) a charging process by inserting a universal serial bus (USB) of the main device comprises the following steps: (1) inserting the USB of the main device; and (2) opening the first charging port by the first switch, and notifying the second control module by the first control module to allow the second control module to control the second switch to close the first charging port;
(b) a charging process by inserting a USB of the accessory device comprises the following steps: (1) inserting the USB of the accessory device; and (2) opening the second charging port by the second switch, and notifying the first control module by the second control module to allow the first control module to control the first switch to close the second charging port; and
(c) a charging process by simultaneously inserting the USB of the main device and the USB of the accessory device comprises the following steps: (1) simultaneously inserting the USB of the main device and the USB of the accessory device; (2) upon the first control module being notified about the simultaneously inserting of the USBs by the second control module, controlling by the first control module the first switch to open only the first charging port and close the second charging port; and (3) upon the second control module being notified about the simultaneously inserting of the USBs by the first control module, controlling by the second control module the second switch to open only the second charging port and close the first charging port.

7. The charging method of claim 4, wherein:
(a) a charging process by inserting a charger of the main device and inserting a USB of the accessory device comprises the following steps: (1) inserting the charger of the main device and inserting the USB of the accessory device; (2) notifying the first control module about the inserting of the USB by the second control module; (3) upon identifying by the first control module that the main device has an inserted charger, controlling the first switch by the first control module to assign high priority to the charger, only open the first charging port, and close the second charging port; and (4) upon detecting the inserting of the USB by the second control module, controlling the second switch by the second control module to open the second charging port and close the first charging port; and
(b) a charging process by inserting a USB of the main device and inserting a charger of the accessory device comprises the following steps: (1) inserting the charger of the accessory device and inserting the USB of the main device; (2) notifying by the first control module the second control module about the inserting of the USB; (3) upon identifying by the second control module that the accessory device has the inserted charger, controlling the second switch by the second control module to assign high priority to the charger, only open the second charging port, and close the first charging port; and (4) upon detecting the inserting of the USB by the first control module, controlling the first switch by the first control module to open the first charging port and close the second charging port.

8. The charging method of claim 4, wherein the first control module and the second control module interact to realize power and charge management.

9. The charging method of claim 4, wherein the first charging port connecting the first switch and the second switch through VBUS, and the second charging port connects the first switch and the second switch through VBUS.

10. The charging method of claim 4, wherein the first control module is electrically connected with the second control module using GPIO control protocol.

11. The charging method of claim 4, wherein a mutual battery charging process for the main device and the accessory device alternates and circulates until power is exhausted.

12. The charging method of claim 11, wherein a charging current in the mutual battery charging process for the main device and the accessory device is limited to a low current value.

13. The charging method of claim 12, wherein the charging current in the mutual battery charging process for the main device and the accessory device is limited to 500 mA.

\* \* \* \* \*